(12) United States Patent
Van Garrel et al.

(10) Patent No.: US 10,227,963 B2
(45) Date of Patent: Mar. 12, 2019

(54) ROTOR BLADE FOR A WIND TURBINE, AND WIND TURBINE FIELD

(71) Applicant: STICHTING ENERGIEONDERZOEK CENTRUM NEDERLAND, Petten (NL)

(72) Inventors: Arne Van Garrel, Petten (NL); Edwin Theodorus Gerardus Bot, Petten (NL)

(73) Assignee: STICHTING ENERGIEONDERZOEK CENTRUM NEDERLAND, Petten (NL)

( * ) Notice: Subject to any disclaimer, the term of this patent is extended or adjusted under 35 U.S.C. 154(b) by 477 days.

(21) Appl. No.: 14/908,909

(22) PCT Filed: Jul. 24, 2014

(86) PCT No.: PCT/NL2014/050505
§ 371 (c)(1),
(2) Date: Jan. 29, 2016

(87) PCT Pub. No.: WO2015/016704
PCT Pub. Date: Feb. 5, 2015

(65) Prior Publication Data
US 2016/0177919 A1    Jun. 23, 2016

(30) Foreign Application Priority Data
Jul. 30, 2013  (NL) .................................... 2011236

(51) Int. Cl.
F03D 1/06    (2006.01)
F03D 9/25    (2016.01)

(52) U.S. Cl.
CPC ......... F03D 1/0675 (2013.01); F03D 1/0633 (2013.01); F03D 9/257 (2017.02);
(Continued)

(58) Field of Classification Search
CPC .......................... F03D 1/0633; F03D 1/0675
See application file for complete search history.

(56) References Cited

U.S. PATENT DOCUMENTS 6,431,498 B1    8/2002  Watts et al.
8,414,261 B2*   4/2013  Bonnet ................. F03D 1/0641
                                                    415/119
(Continued)

FOREIGN PATENT DOCUMENTS

DE      102 13 122 A1    10/2003
DE   10 2006 043 462 A1   3/2008
(Continued)

OTHER PUBLICATIONS

International Search Report, dated Oct. 14, 2014, from corresponding PCT Application.

*Primary Examiner* — Woody A Lee, Jr.
(74) *Attorney, Agent, or Firm* — Young & Thompson

(57) ABSTRACT

Rotor blade for a wind turbine, including a main blade part (4) with a blade tip (8). The blade tip (8) results in a blade tip vortex downstream of the rotor blade (1) during operation. The blade tip (8) includes a vortex de-stabilizer (7) which is configured to de-stabilize the blade tip vortex during operation of the rotor blade (1). Furthermore, a wind turbine field including a plurality of wind turbines positioned in a grid. One or more wind turbines on a boundary of the predetermined grid (e.g. a front row of the grid) are provided with at least one such rotor blade (1).

16 Claims, 3 Drawing Sheets

(52) U.S. Cl.
CPC ..... *F05B 2240/122* (2013.01); *F05B 2240/30* (2013.01); *F05B 2260/96* (2013.01); *Y02E 10/721* (2013.01)

(56) References Cited

U.S. PATENT DOCUMENTS

| | | | | |
|---|---|---|---|---|
| 8,932,024 B2* | 1/2015 | Hayashi | ................ | F03D 1/0608 416/228 |
| 2003/0099546 A1* | 5/2003 | Stiesdal | ................ | F03D 1/0641 416/228 |
| 2004/0061029 A1* | 4/2004 | McCarthy | ............. | B64C 23/072 244/199.4 |
| 2009/0016891 A1 | 1/2009 | Parsania et al. | | |
| 2009/0074585 A1* | 3/2009 | Koegler | ................ | F03D 1/0675 416/228 |
| 2011/0309202 A1* | 12/2011 | Smith | ................... | B64C 23/065 244/208 |
| 2015/0098821 A1* | 4/2015 | Mayda | ................. | F03D 7/0232 416/23 |

FOREIGN PATENT DOCUMENTS

| | | |
|---|---|---|
| DE | 10 2008 002 930 A1 | 1/2009 |
| EP | 1 314 885 A1 | 5/2003 |
| EP | 2 270 312 A1 | 1/2011 |
| EP | 2 508 750 A1 | 10/2012 |
| WO | 2009/098340 A1 | 8/2009 |

\* cited by examiner

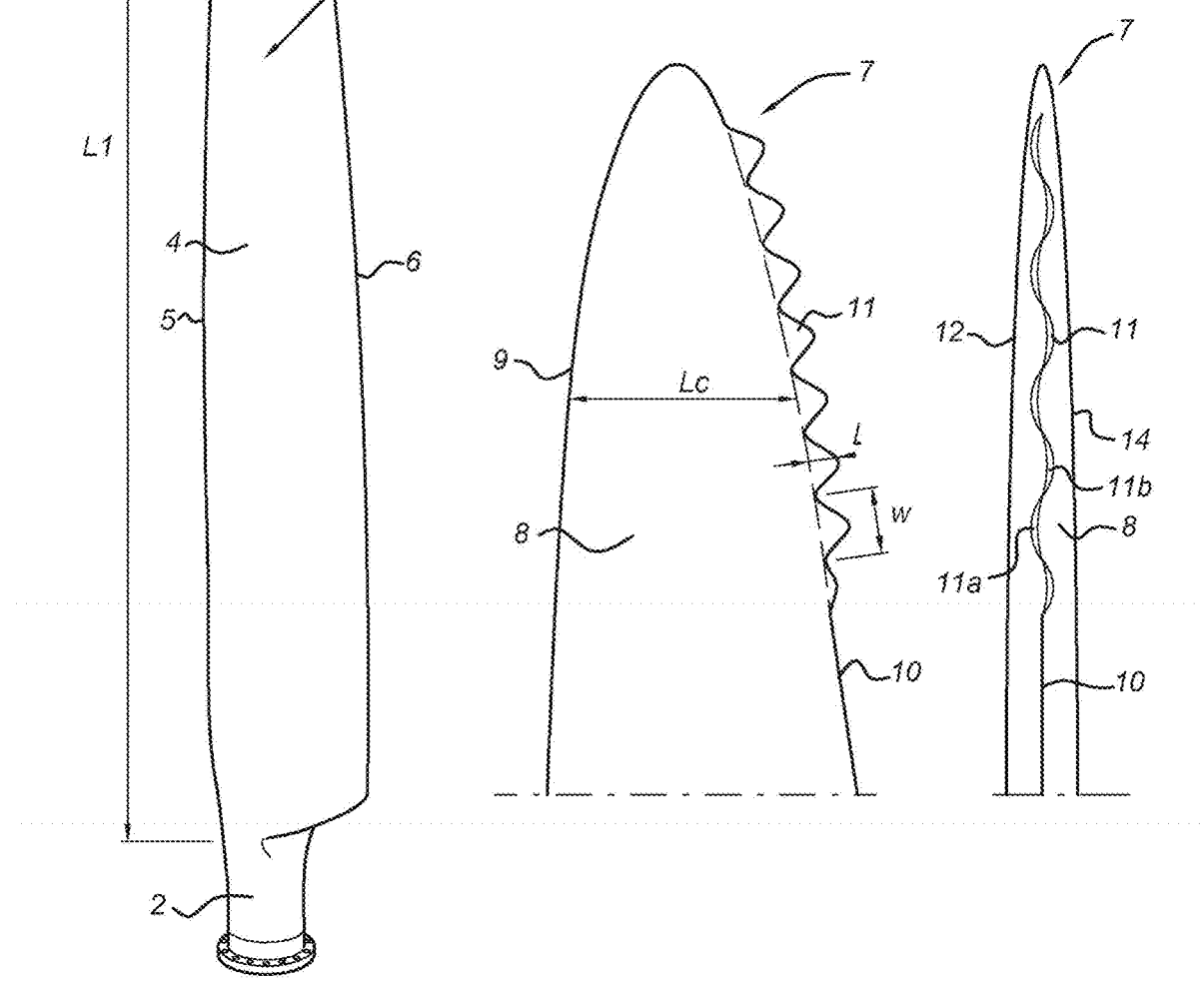

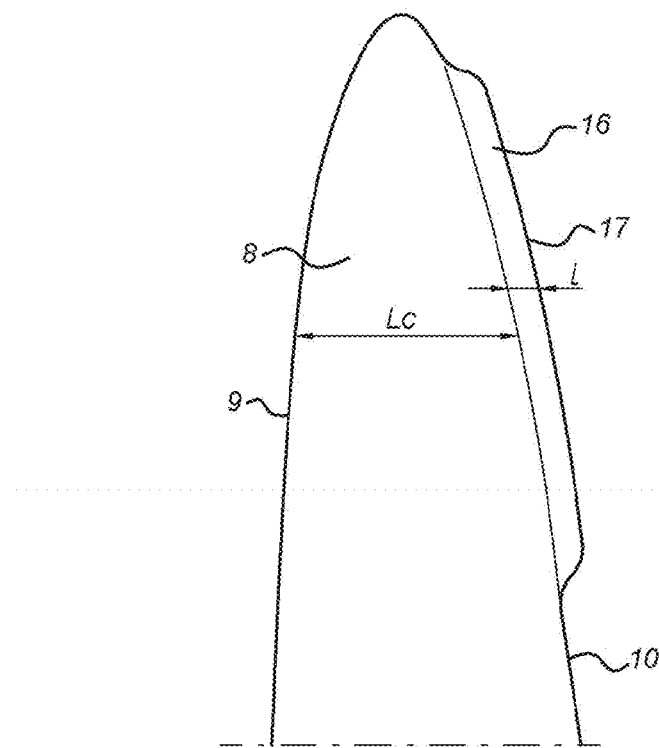
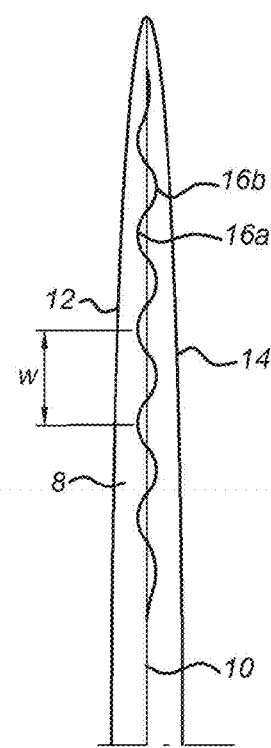
Fig. 5a  Fig. 5b
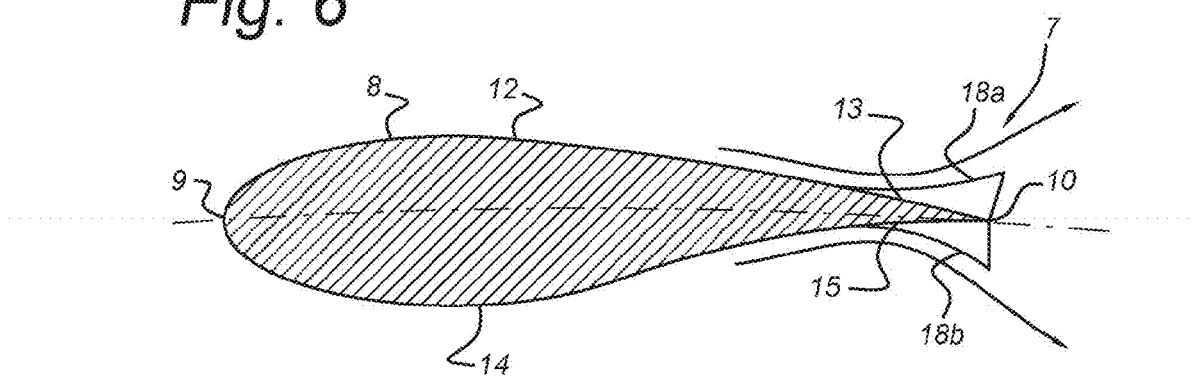
Fig. 6

ROTOR BLADE FOR A WIND TURBINE, AND WIND TURBINE FIELD

FIELD OF THE INVENTION

The present invention relates to a rotor blade for a wind turbine comprising a main blade part with a blade tip, which during operation results in a blade tip vortex downstream of the rotor blade. In a further aspect, the present invention relates to a wind turbine field comprising a plurality of wind turbines positioned in a predetermined grid.

PRIOR ART

European patent application EP-A-2 508 750 discloses a wind turbine, wherein a part of each rotor blade is provided with a panel having a serrated edge or saw tooth profile, or with a flat replacement panel, in order to reduce noise. The panels as disclosed in this publication span about one third of the length of a rotor blade, which is needed to indeed influence the noise emission of the wind turbine.

U.S. Pat. No. 6,431,498 B1 (Watts et al.) discloses an apparatus to modify a wing to provide increased lift over drag ratios compared to similar wings with straight leading edges. For wings extending in a lateral direction, and defining a longitudinal upstream direction, the apparatus forms a laterally extending leading edge facing in the upstream direction ('scalloped wing leading edge'). The apparatus forms a plurality of protrusions spaced laterally along the leading edge, the protrusions creating a smoothly varying, alternately forward-and-aft sweep along the leading edge relative to the upstream flow direction along the leading edge.

U.S. patent application 2009/0074585 (Koegler et al.) discloses a wind generator and turbine blade comprising a trailing edge with very narrow serrations for reducing trailing edge noises during operation of the turbine blade. In an embodiment, a trailing edge of the turbine blade comprises a plurality of triangular serrations, having a length in airflow direction of about 10-40% of the local airfoil chord.

These prior art turbine blades are designed to maximize lift, minimize drag, provide maximum aerodynamic efficiency of the rotor blade, and/or to lower sound emissions.

SUMMARY OF THE INVENTION

The present invention seeks to improve all over efficiency of a plurality of wind turbines in a wind farm or wind park setting. For this, the present invention seeks to modify the wind flow behavior of one or more wind turbines by modifying the aerodynamics of a rotor blade.

According to the present invention, a rotor blade for a wind turbine is provided as defined above, wherein the blade tip comprises a vortex de-stabilizer which is configured to de-stabilize the blade tip vortex during operation of the rotor blade.

In a further embodiment, the blade tip has a span wise total length of at most 10% of a span wise total length of the main blade part, e.g. at most 5%. This provides for only a limited penalty in efficiency of the specific rotor blade with the vortex de-stabilizer in combination with the desired improvement in wake mixing.

From experiments on a plurality of wind turbines in a row-wise arrangement, it has been found that a wind turbine operating in a wake generated by two or more upstream wind turbines may produce more energy than a wind turbine operating in a wake generated by a single upstream wind turbine. It has also been found that reduced power generation of a wind turbine driven in the wake from a most upstream wind turbine does not necessarily correspond to or imply reduced wind energy in the wake of said most upstream turbine. This surprising effect is attributed to a lack of mixing or turbulence in the wake generated by the most upstream wind turbine. Also, for a row wise arrangement of a plurality of wind turbines it has been found that a lack of mixing or turbulence immediately behind a most upstream wind turbine causes downstream wind turbines to generate less power and become less efficient.

The surprising and counter intuitive effect of the present invention is that a decrease in efficiency of one or more upstream wind turbines in a wind turbine field actually improves downstream wind turbine efficiency such that an overall efficiency of the wind turbine field (wind turbine power plant or wind farm) is actually increased.

In a group of embodiments, the vortex de-stabilizer provides for a changing local chord or a periodicity along the trailing edge with a periodic width between 30% and 300% of an associated local chord length of the blade tip. In further embodiments, the periodic width is between 50% and 200%, or even between 80% and 160%, such as 100% of the associated local chord length of the blade tip. The changing local chord may result in a sinus-type of variation, but also other forms may be used, such as triangular of trapezium shape variations. These values of periodic width are clearly larger than the periodic shapes used in prior art publications for noise reduction purposes (which in fact try to mimic a bird feather).

In an advantageous embodiment, the vortex de-stabilizer comprises one or more local surface modification elements (e.g. in the form of chord extensions) along a trailing edge of the blade tip. This will result in a span wise varying or oscillatory lift distribution on the blade tip. The span wise varying lift distribution provides additional blade tip vortices that improve wake mixing in the area downstream of the wind turbine provided with such a rotor blade, at the expense of a small loss in efficiency of the wind turbine provided with the modified rotor blade.

In further embodiments, the vortex de-stabilizer comprises one or more downward deflection elements or lower surface modifications of the blade tip, and/or one or more upward deflection elements or upper surface modifications of the blade tip. Downward deflection elements tend to have a larger desired effect on wake mixing, as these type of local surface modification elements increase lift locally by an increased chord, an aft camber increase and an increased angle-of-attack.

The number of local surface modification elements is in an advantageous embodiment between one and eight, which provides for a sufficient effect on wake mixing and for an easy modification possibility of existing rotor blades. In a further group of embodiments, the vortex de-stabilizer is arranged to form a secondary trailing edge for the blade tip, wherein the secondary trailing edge is a straight trailing edge, i.e. along the vortex de-stabilizer, the blade tip has a continuous chord-wise length.

The vortex de-stabilizer has an extension length of between 0% to 25% of an associated local cord length of the blade tip in a further embodiment, which provides for a sufficient effect on the wake vortex of the rotor blade and associated wind turbine.

The actual implementation of the vortex de-stabilizer may comprise one or more of an element providing a local chord variation of the rotor blade profile, an element providing a local airfoil variation of the rotor blade profile (e.g. an aft camber increase/decrease; angle-of-attack increase/decrease), an element providing a local twist variation of the rotor blade profile, a local chord extension element, a straight flap, a curved flap, a trailing edge deflector, a Guerney flap, etc. All these types of elements are known as such to the person skilled in the art of aerodynamics, and may be used to improve the wake mixing downstream of the rotor blade by introducing an oscillatory lift distribution over the length of the blade tip for de-stabilizing a blade tip vortex.

Present day rotor blades may be equipped with a the blade tip comprising a winglet or tip vane. According to a further embodiment, the vortex de-stabilizer is provided at least partly on the winglet or tip vane, which is a very efficient location to influence the rotor blade vortex. The vortex de-stabilizer comprises one or more separate elements attachable to the blade tip of the rotor blade in an even further embodiment. As one or more separate elements, which can be affixed to the rotor blade using e.g. a bolt connection, glue (e.g. resin) or a clamping connection, modification of existing rotor blades is possible in an efficient manner. Having a vortex de-stabilizer as an add-on piece significantly reduces maintenance and upgrade costs of prior art rotor blades as they need not be replaced completely, eliminating the use of heavy lifting and transportation equipment and retains the mechanical properties of the underlying structure in case of blades designed with the vortex de-stabilizer taken into account.

In a further aspect the present invention relates to a wind turbine field (or wind turbine farm, wind turbine power plant) as defined above, wherein at least one wind turbine on a boundary of the predetermined grid is provided with at least one rotor blade according to one of the present invention embodiments. E.g. the wind turbines on the boundary of the predetermined grid are all provided with such a modified rotor blade, or the wind turbines on a part of the boundary of the predetermined grid which faces local prevailing winds. As a result of the improved wake mixing of the modified wind turbines (at the 'front' row of a wind turbine field), the downstream wind turbine will have a better efficiency, and thus the overall efficiency of the wind turbine field will be improved.

These and other features and advantages of the present invention will become apparent by way of example in the detailed description of exemplary embodiments.

SHORT DESCRIPTION OF DRAWINGS

The present invention will be discussed in more detail hereinafter based on a number of exemplary embodiments with reference to the attached drawings, wherein:

FIG. 1 shows a top view of an embodiment of a rotor blade according to an embodiment of the present invention.

FIGS. 2a and 2b show a top view and side view of an embodiment of a blade tip according to an embodiment of the present invention.

FIGS. 5a and 5b show a top view and side view of yet a further embodiment of a blade tip of a rotor blade according to a present invention embodiment.

FIG. 6 shows a cross sectional view of a further embodiment of a blade tip of a rotor blade according to the present invention.

DETAILED DESCRIPTION OF EXEMPLARY EMBODIMENTS

Figure 3:
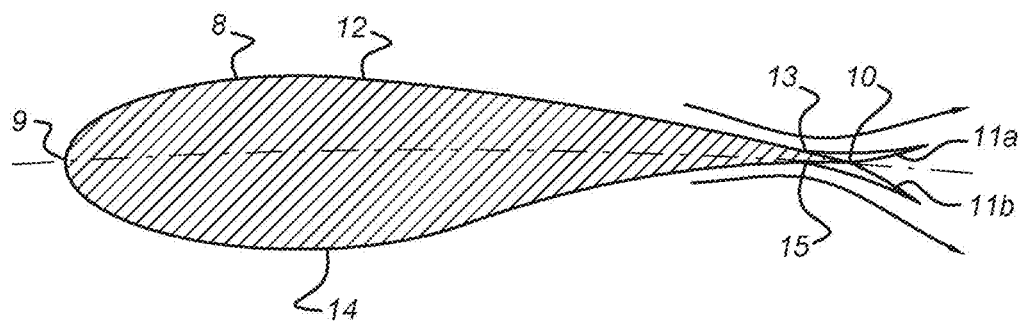
FIG. 3 shows a cross sectional view of a further embodiment of a blade tip of a rotor blade according to the present invention.

For clarity and ease of reference, a plurality or a multiple of wind turbines will be referred to as a wind turbine field, power plant or farm. Although a wind turbine field could comprise e.g. a single wind turbine, in view of the present invention a wind turbine field comprises at least two wind turbines, i.e. a plurality of wind turbines.

The term "upstream" shall refer to a direction which is substantially parallel to but in opposite direction of the governing wind direction relative to a wind turbine (field). The term "downstream" shall refer to a direction which is substantially parallel to and in the same direction of the governing wind direction.

According to the present invention, increasing the efficiency and power generation of a wind turbine field may be accomplished by generating sufficient turbulence in a wake immediately following a most upstream wind turbine on a boundary of a wind turbine field. Surprisingly it has been found that by generating sufficient turbulence immediately behind the most upstream wind turbine (wake vortex mixing) in a wind turbine field causes downstream wind turbines to generate more power than in a situation where no wake vortex mixing is occurring. As a result, the wind turbine field or wind farm as a whole becomes more efficient and generates more power.

FIG. 1 shows a top view of an embodiment of a rotor blade according to an embodiment of the present invention. The rotor blade 1 comprises a main blade part 4 having a root part 2 connectable to a rotor and a blade tip 8 fixedly connected to the main blade part 4 distal to the root part 2. The main blade part 4 comprises a straight leading edge 5 and a straight trailing edge 6, both extending along a span-wise total length L1 of the main blade part 4. The straight leading and trailing edges 5, 6 are smooth edges commonly found on known prior art rotor blades, wherein the straight leading edge 5 and straight trailing edge 6 each define a smooth monotonically changing edge when viewed in the top view of the rotor blade 1.

There are several ways to generate more turbulence in a wake vortex behind a wind turbine. According to the invention, various embodiments of a rotor blade are provided comprising a main blade part having a root part connectable to a rotor of a wind turbine and a blade tip 8 distal to the root part. During operation of the rotor blade 1, a blade tip vortex behind the wind turbine is de-stabilized by means of a varying lift distribution in a span wise direction of the rotor blade near the blade tip 8. A span wise direction shall refer to a direction along the rotor blade 1 from the root part to the blade tip 8, or vice versa, as viewed in a top view of the rotor blade 1, such as the top view of FIG. 1. The varying lift distribution for vortex de-stabilization may be accomplished through a span wise variation of e.g. chord lengths, airfoil shapes, and/or local blade twist angles of the blade tip 8.

In the present invention embodiments the blade tip 8 comprises a straight leading edge 9 extending along a span-wise total length L2 of the blade tip 8 and a vortex de-stabilizer 7, wherein the vortex de-stabilizer 7 is configured for de-stabilizing blade tip vortices during operation of the rotor blade 1. In the embodiment shown, the vortex de-stabilizer 7 is disposed along a span wise length of a trailing edge 10 of the blade tip 8. The span-wise total length L2 is at most 10% of the span wise total length L1 of the main blade part 4. This provides for the right location for the vortex de-stabilizing with the intended purpose, without providing too much of a penalty in wind turbine efficiency. In a further embodiment, the vortex de-stabilizer 7 is provided on a section of the blade tip 8 having a span wise total length L2 of at most 5% of the span wise total length L1 of the main blade part 4. This still provides for sufficient vortex de-stabilization, yet provides for even less influence on drag, etc. of the rotor blade 1.

More precisely, the vortex de-stabilizer 7 of the present invention is capable of de-stabilizing a blade tip vortex by generating additional blade tip vortices through a span wise varying lift distribution on the blade tip 8 during operation of the rotor blade 1. The blade tip 8 of the invention increases and promotes mixing of the wake behind the rotor blade 1 as well as the atmospheric boundary layer near the blade tip 8. As a result, power generation of downstream wind turbines of a wind turbine field is further increased.

FIG. 2a shows a top view of an embodiment of a blade tip 8 according to the present invention. The blade tip 8 comprises a straight leading edge 9 extending along a span-wise total length L2 of the blade tip 8 and a vortex de-stabilizer 7 disposed along the span wise length L2 of a trailing edge 10 of the blade tip 8. In the embodiment shown, the vortex de-stabilizer 7 comprises one or more surface modification elements in the form of local chord extensions 11. The local chord extensions 11 locally lengthen the chord beyond the trailing edge 10 of the blade tip 8, indicated in FIG. 2a by two arrows and the reference 1. Hence, a local chord extension 11 has an associated local chord length Lc+1 between the straight leading edge 9 of the blade tip and a most outward point of the local chord extension 11.

The one or more local chord extensions 11 are configured for generating additional trailing vortices that de-stabilize a blade tip vortex of the blade tip 8 during operation of the rotor blade 1, thereby imposing a span wise varying oscillatory lift distribution along the blade tip 8.

FIG. 2b shows a side view of an embodiment of a blade tip 8 according to the present invention. In this embodiment the blade tip 8 comprises an upper tip surface 12 and lower tip surface 14. The surface modification elements are now implemented as one or more local chord extensions 11a, 11b which are arranged in an upward fashion (upward deflection elements 11a), downward fashion (downward deflection elements 11b) or an alternating combination thereof (as shown in the embodiment of FIG. 2b). The term "upward" shall refer to a direction viewed from the trailing edge 10 of the blade tip 8 toward the upper tip surface 12 and the term "downward" shall refer to a direction from the trailing edge 10 of the blade tip 8 toward the lower tip surface 14.

In further embodiments, each one the one or more local chord extensions 11 are arranged in a neutral fashion with respect to the blade tip 8, meaning that each one of the one or more local chord extensions 11 extends an associated local camber line at a position associated with a local chord extension 11 (forming a wavy trailing edge 10 of the blade tip 8). Here, a camber line of an airfoil shape of e.g. the blade tip 8 is defined as a curve that is halfway between the upper tip surface 12 and lower tip surface 14 of the blade tip 8.

The above arrangements of the one or more local chord extensions 11 can be further explained by a cross-sectional view of an embodiment of a blade tip 8 according to the present invention, as shown in FIG. 3.

The embodiment of a blade tip 8 shown in FIG. 3 comprises one or more local chord extensions 11a, 11b disposed along the trailing edge 10 of the blade tip 8, wherein the trailing edge 10 of the blade tip 8 comprises an upper trailing edge surface 13 and lower trailing edge surface 15. Typically, two embodiments of local cord extensions 11a, 11b may be envisaged that provide a wavy trailing edge configuration for the blade tip 8.

In a first embodiment, each one of the one or more local chord extensions 11b provides a camber enhancing lower tip surface 14 modification or lower trailing edge surface 15 modification. In a second embodiment, the one or more local chord extensions 11a, 11b provide a camber enhancing upper tip surface 12 modification or upper trailing edge surface 13 modification in alternating fashion along the trailing edge 10 of the blade tip 8. The one or more local cord extensions 11a, 11b provide an decreased or increased angle of attack and lift, as a result of which further wake mixing is achieved.

With regard to dimensions of the one or more local chord extensions 11 as described above in relation to the embodiments of FIGS. 1, 2a, 2b and 3, each one of the one or more local chord extensions 11 has a width w between 40% and 200% of a local chord length Lc, e.g. between 50% and 200%. This is a range of much larger values than the width typically employed in trailing edge modifications for noise reduction, such as serrations. E.g. in prior art document US2009/0074585, the length of the serrations is defined as between 10 and 40% of the local chord, and the ratio of length to width of the serrations is defined as being between 1:1 and 4:1 of the serration length. In these prior art embodiments, typically the width of a serration is thus less than 40% of the local chord length, or even much smaller. In further embodiments of the present invention, the periodic width w is between 80% and 160%, such as 100% of the associated local chord length Lc. This ensures that during operation sufficient additional vortices are generated at the blade tip 8 to obtain the desired effect of this invention, i.e. vortex de-stabilization.

In further embodiments, each one of the one or more local chord extensions 11 has a length/between 0% to 25% of a local cord length Lc.

Figure 4A:
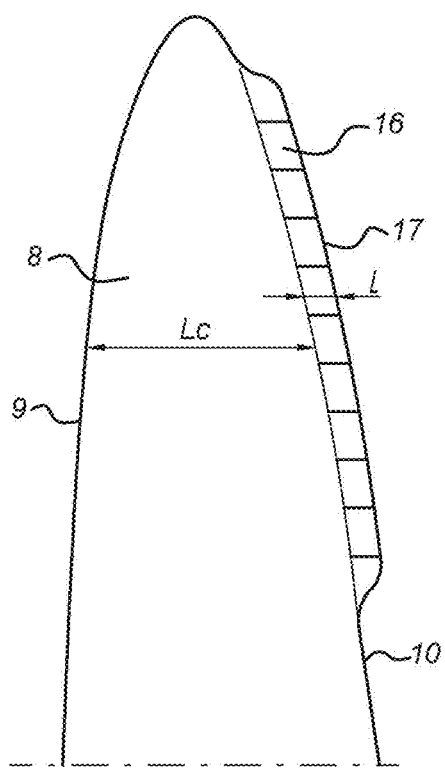
FIGS. 4a and 4b show a top view and side view of an even further embodiment of a blade tip of a rotor blade.
Figure 4B:
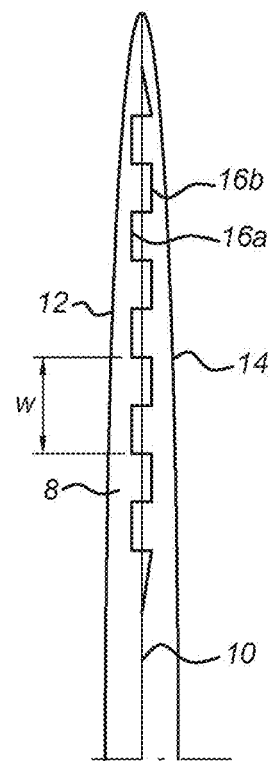

FIGS. 4a and 4b show, respectively, a top view and a side view of a further embodiment of a blade tip 8 according to the present invention. As shown in FIG. 4a, each one of the one or more surface modification elements are implemented as local chord extensions 16, 16a, 16b which comprise a straight extending trailing edge 17 substantially parallel to the trailing edge 10 of the blade tip 8. In essence, each one of the one or more local chord extensions 16a, 16b shifts the trailing edge 10 of the blade tip 8 further back by a distance 1, yielding the straight extending trailing edge 17.

Note that the one or more local chord extensions 11 depicted in FIG. 2a provide a wavy or sinusoidal trailing edge configuration for the blade tip 8 as seen in a top view of the blade tip 8 of FIG. 2a. This is not the case for the embodiment shown in FIG. 4a, wherein the trailing edge 10 of the blade tip 8 is shifted backward in a parallel fashion from a local chord length Lc to an enlarged local chord length Lc+1, yielding an extending trailing edge 17 for each one of the one or more local chord extensions 16.

In an advantageous embodiment, the one or more local chord extensions 16a, 16b are arranged in an upward fashion 16a, downward fashion 16b or a combination thereof, yielding a span wise varying oscillatory lift distribution along the blade tip 8 for de-stabilization of the blade tip vortex (the last alternative being shown in the embodiment of FIG. 4b).

In a further advantageous embodiment, each one of the one or more local chord extensions 16 is a substantially flat rectangular flap. In this embodiment the one or more local chord extensions 16a, 16b are substantially flat rectangular flaps providing a more discontinuous or non-smooth trailing edge configuration for the blade tip 8, yielding stronger wake mixing.

FIGS. 5a and 5b show, respectively, a top view and a side view of a further embodiment of a blade tip 8 according to the present invention. As depicted in FIG. 5a, each one of the one or more local chord extensions 16a, 16b comprises a straight extending trailing edge 17 substantially parallel to the trailing edge 10 of the blade tip 8, essentially shifting the trailing edge 10 of the blade tip 8 further backward, or changing from a local chord length Lc to an enlarged local chord length Lc+1. In FIG. 5b it can be seen that the one or more local chord extensions 16a, 16b provide a wavelike or sinusoidal trailing edge configuration in upward and downward direction, still providing sufficient distortion of the blade tip vortex.

Note that the one or more local chord extensions 16a, 16b depicted in FIG. 4b provide a more discontinuous or non-smooth trailing edge configuration for the blade tip 8 compared to the wavelike or sinusoidal trailing edge configuration shown in FIG. 5b. As a result, the span wise varying lift distribution for the blade tip 8 shown in the embodiment of FIG. 4b may be less smooth or less gradual then the span wise varying lift distribution for the blade tip 8 shown in FIG. 5b.

It is noted that the elements forming the vortex de-stabilizer 7 as discussed in relation to the embodiments described above are aligned in the airflow direction over the rotor blade 1, without any deviation or angle. This ensures as little negative influence on drag etc. of the rotor blade 1, yet still obtaining the desired effect of vortex de-stabilization.

According to the present invention, the span wise varying lift distribution on the blade tip 8 during operation of the rotor blade 1 may also be accomplished without locally extending local cord lengths of the blade tip 8 as depicted in FIG. 2a, 4a or 5a. Instead, the rotor blade 8 of the present invention may be provided with a vortex de-stabilizer 7 comprising one or more air deflectors disposed along trailing edge surfaces without locally extending the trailing edge 10 of the blade tip 8, yet still providing a sufficient degree of wake vortex mixing. As an alternative, the blade tip 8 may be provided with modifications of the rotor blade 1 that include a local twist angle of the rotor blade 1. Again, this may be implemented in the complete rotor blade design, or added as one or more separate elements.

For example, FIG. 6 shows a cross sectional view of a further embodiment of a blade tip 8 according to the present invention. In this embodiment, the vortex de-stabilizer 7 comprises one or more surface modification elements in the form of trailing edge deflectors 18a, 18b, wherein each one of the one or more trailing edge deflectors 18a, 18b is disposed on an upper trailing edge surface 13, respectively a lower trailing edge surface 15 between the straight leading edge 9 and trailing edge 10 of the blade tip 8. The one or more trailing edge deflectors 18a, 18b do not extend beyond the trailing edge 10 of the blade tip 8 in this embodiment, however a span wise varying lift distribution is now obtained through additional local air deflection by the one or more trailing edge deflectors 18a, 18b. The one or more trailing edge deflectors 18a, 18b provide additional blade tip vortices during operation of the blade tip 8, so that a span wise lift distribution on the blade tip is changed and additional blade tip vortices are generated, hence wake mixing is increased.

In an embodiment, each one of the one or more trailing edge deflector 18a, 18b comprises a smooth deflection surface smoothly extending an associated upper tip surface 12 or an associated lower tip surface 14. More precisely, for a trailing edge deflector 18a disposed on an upper trailing edge surface 13 at a particular span wise position on the blade tip 8, the trailing edge deflector 18a comprises a smooth deflection surface that smoothly extends the upper tip surface 12 at the particular span wise position on the blade tip 8. Conversely, for a trailing edge deflector 18b disposed on a lower trailing edge surface 15 at a particular span wise position on the blade tip 8, the trailing edge deflector 18b comprises a smooth deflection surface that smoothly extends the lower tip surface 14 at the particular span wise position on the blade tip 8.

Each one of the one or more trailing edge deflectors 18a, 18b provide further an aft camber increase of the blade tip 8, thereby providing a varying lift distribution for de-stabilizing blade tip vortices.

In an alternative embodiment, each one of the one or more trailing edge deflectors 18a, 18b comprises a substantially perpendicular deflection surface with respect to an associated upper tip surface 12 or associated lower tip surface 14 (also known in the field as Guerney flaps). That is, for a trailing edge deflector 18a disposed on an upper trailing edge surface 13 at a particular span wise position on the blade tip 8, the trailing edge deflector 18a comprises a substantially perpendicular deflection surface with respect to the upper tip surface 12 at the particular span wise position on the blade tip 8. Conversely, for a trailing edge deflector 18b disposed on a lower trailing edge surface 15 at a particular span wise position on the blade tip 8, the trailing edge deflector 18b comprises a substantially perpendicular deflection surface with respect to the lower tip surface 14 at the particular span wise position on the blade tip 8. Each one of the one or more trailing edge deflectors 18a, 18b is disposed between the straight leading edge 9 and trailing edge 10 of the blade tip 8, providing a varying lift distribution for de-stabilizing blade tip vortices.

In a typical embodiment, each one of the one or more trailing edge deflectors 18a, 18b comprises an L-shaped deflector disposed on an upper trailing edge surface 13 or a lower trailing edge surface 15. The L-shaped deflector increases wake mixing and provides additional blade tip vortices, and provide for an easy retrofit to an existing rotor blade 1.

The trailing edge modifications of the blade tip 8 of the present invention embodiments comprise any previously disclosed modification such as the one or more local chord extensions 11a, 11b, 16a, 16b, the aft camber modifications 18a, 18b and an the increase of an angle of attack 11b, 16b, 18b. All these modifications locally increase the lift on the blade tip 8 during operation of the rotor blade 1, thereby provide further wake mixing and additional blade tip vortices.

In advantageous embodiments the trailing edge modification of the blade tip 8 may be integrally formed with the blade tip 8 during the manufacturing process of a rotor blade 1. This allows the latest airfoil shape technologies of main blade parts 4 to be combined with the trailing edge modifications of the present invention. On the other hand, much can be gained by modifying existing regular rotor blades, that is, rotor blades having a straight trailing edge along a span wise total length of the rotor blade. To that end, the vortex de-stabilizer 7 is a separate piece attachable to a blade tip of a regular rotor blade. In this embodiment, existing regular rotor blades may be retrofitted with the vortex de-stabilizer 7 of the present invention, so that power generation of existing wind turbine fields or wind farms may be improved.

On a further note, the present invention could also be used in combination with or as part of e.g. winglets or tip vanes, which would provide additional degrees of freedom to de-stabilize blade tip vortices.

The use of the blade tip 8 comprising a vortex de-stabilizer 7 is advantageous for an outer ring of one or more wind turbines on the boundary of a wind turbine field. Thus, the present invention is particular suitable for a wind turbine field comprising a plurality of wind turbines, wherein at least one wind turbine on a boundary of the wind turbine field is provided with at least one rotor blade 1 according to any one of the embodiments described above. In further embodiments, all wind turbines on an outer ring of a grid of a wind turbine field are provided with one or more rotor blades according to one of the embodiments described herein, ensuring that the wake vortex mixing is always present irrespective of the actual wind direction during operation. In an even further embodiment, only a row of 'front' side wind turbines is fitted with a modified rotor blade, e.g. the row of wind turbines in the grid facing the most prevailing wind direction for the location of the wind turbine field.

In view of the invention, a blade tip 8 comprising a vortex de-stabilizer 7 having varying chord lengths, aft camber modifications, and/or twists near the blade tip 8 to generate extra trailing vortices to de-stabilize the tip vortex is particular advantageous for efficiency improvements of wind turbine fields or wind farms.

It is noted that prior art rotor blades and rotor blade modifications focus on higher aerodynamic performance, lower drag, and/or lower noise levels. The rotor blade 1 of the present invention on the other hand is expected to give a somewhat higher drag and a lower power output for a wind turbine on which the rotor blade 1 is installed. The idea of the present invention is that the rotor blade 1 ought to be installed on one or more wind turbines on a boundary of the wind farm, so that downstream wake mixing is improved and the entire wind turbine power plant produces more power. In view of this, the present invention has the surprising effect that a local decrease of wind turbine efficiency actually improves the efficiency of the entire wind turbine field.

The present invention embodiments have been described above with reference to a number of exemplary embodiments and drawings. Modifications and alternative implementations are included in the scope of protection of the appended claims.

The invention claimed is:

1. A wind turbine field comprising:
a plurality of wind turbines positioned in a predetermined grid, wherein only on a boundary of the predetermined grid at least one wind turbine is provided with at least one rotor blade comprising a main blade part with a blade tip, the blade tip resulting in a blade tip vortex downstream of the rotor blade during operation,
wherein the blade tip comprises a vortex de-stabilizer, the vortex de-stabilizer comprising one or more local surface modification elements in a span wise area at the blade tip and being configured to de-stabilize the blade tip vortex and increase wake mixing downstream of the at least one wind turbine during operation of the rotor blade, and the vortex de-stabilizer being provided along a span wise total length L2 of at most 10% of a span wise total length L1 of the main blade part.

2. The wind turbine field of claim 1, wherein the vortex de-stabilizer is provided along a span wise total length L2 of at most 5% of a span wise total length (L1) of the main blade part.

3. The wind turbine field of claim 1, wherein the vortex de-stabilizer has a periodicity along the trailing edge with a periodic width between 40% and 300% of an associated local chord length Lc of the blade tip.

4. The wind turbine field of claim 3, wherein the periodic width is between 50% and 200%, of an associated local chord length Lc of the blade tip.

5. The wind turbine field of claim 3, wherein the periodic width is between 80% and 160% of an associated local chord length Lc of the blade tip.

6. The wind turbine field of claim 3, wherein the periodic width is equal to 100% of an associated local chord length Lc of the blade tip.

7. The wind turbine field of claim 1, wherein the vortex de-stabilizer comprises one or more surface modification elements along a trailing edge of the blade tip.

8. The wind turbine field of claim 7, wherein the vortex de-stabilizer comprises one or more downward deflection elements.

9. The wind turbine field of claim 7, wherein the vortex de-stabilizer comprises one or more upward deflection elements.

10. The wind turbine field of claim 7, wherein the vortex de-stabilizer is arranged to form a secondary trailing edge for the blade tip, wherein the secondary trailing edge is a straight trailing edge.

11. The wind turbine field of claim 1, wherein the vortex de-stabilizer has an extension length of between 1% to 25% of an associated local cord length Lc of the blade tip.

12. The wind turbine field of claim 1, wherein the vortex de-stabilizer comprises one or more of:
an element providing a local chord variation of the rotor blade profile;
an element providing a local airfoil variation of the rotor blade;
an element providing a local twist variation of the rotor blade profile;
a local chord extension element; a straight flap; a curved flap; a trailing edge deflector; a Guerney flap.

13. The wind turbine field of claim 1, wherein the blade tip comprises a winglet or tip vane, and the vortex de-stabilizer is provided at least partly on the winglet or tip vane.

14. The wind turbine field of claim 1, wherein the vortex de-stabilizer comprises one or more separate elements attachable to the blade tip of the rotor blade.

15. The wind turbine field of claim 1, wherein all the wind turbines on the boundary of the predetermined grid are provided with the at least one rotor blade.

16. The wind turbine field of claim 1, wherein only the wind turbines on a part of the boundary of the predetermined grid that is most upstream from the prevailing wind direction are provided with the at least one rotor blade.

* * * * *